US011011131B2

(12) United States Patent
Zhou (10) Patent No.: US 11,011,131 B2
(45) Date of Patent: May 18, 2021

(54) OFF-SCREEN CONTROL METHOD DETERMINING SIGNAL INTENSITY CALIBRATION VALUE FOR FILMED DISPLAY SCREEN

(71) Applicant: GUANGDONG OPPO MOBILE TELECOMMUNICATIONS CORP., LTD., Guangdong (CN)

(72) Inventor: Yibao Zhou, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/677,265

(22) Filed: Nov. 7, 2019

(65) Prior Publication Data

US 2020/0074956 A1 Mar. 5, 2020

Related U.S. Application Data

(63) Continuation of application No. PCT/CN2018/085677, filed on May 4, 2018.

(30) Foreign Application Priority Data

May 16, 2017 (CN) .......................... 201710343828.0

(51) Int. Cl.
*G09G 5/00* (2006.01)
*G06F 9/451* (2018.01)
(Continued)

(52) U.S. Cl.
CPC ............. *G09G 5/003* (2013.01); *G06F 9/451* (2018.02); *G09G 5/10* (2013.01);
(Continued)

(58) Field of Classification Search
CPC ...... G06F 3/041; G06F 3/0412; G06F 3/0414; G06F 3/042; G06F 3/043; G06F 3/044;
(Continued)

(56) References Cited

U.S. PATENT DOCUMENTS 10,403,232 B2 * 9/2019 Zhou .................. G06F 1/3265
10,429,983 B2 * 10/2019 Zhou .................. G06F 1/3231
(Continued)

FOREIGN PATENT DOCUMENTS

CN 102265252 11/2011
CN 103123394 5/2013
(Continued)

OTHER PUBLICATIONS

EPO, Office Action for EP Application No. 18802794.0, dated Jan. 31, 2020.
(Continued)

*Primary Examiner* — Alexander Eisen
*Assistant Examiner* — Nelson Lam
(74) *Attorney, Agent, or Firm* — Hodgson Russ LLP (57) ABSTRACT

The implementations of the present disclosure disclose a screen-off control method which includes: obtaining a plurality of signal intensity values by performing a signal intensity value reading operation on a proximity sensor the number of times preset; calculating an average intensity value; determining whether a first difference value between the average intensity value and an initial intensity value of the proximity sensor is greater than a preset value; if yes, determining the first difference value to be a signal intensity calibration value; and performing screen-off control according to the signal intensity calibration value and a screen-off threshold value. The present disclosure also provides a screen-off control apparatus, a storage medium, and a terminal.

17 Claims, 6 Drawing Sheets

(51) Int. Cl.
*G09G 5/10* (2006.01)
*H04M 1/72454* (2021.01)

(52) U.S. Cl.
CPC .... *H04M 1/72454* (2021.01); *G09G 2354/00* (2013.01); *H04M 2250/12* (2013.01)

(58) Field of Classification Search
CPC ......... G06F 3/045; G06F 3/046; G09G 5/003; G09G 5/10; G09G 2354/00
USPC .................................................. 345/173–179
See application file for complete search history.

(56) References Cited

U.S. PATENT DOCUMENTS

| | | | | |
|---|---|---|---|---|
| 10,650,789 | B2* | 5/2020 | Zhou | G06F 1/3231 |
| 2010/0048256 | A1* | 2/2010 | Huppi | G06F 3/0416 |
| | | | | 455/574 |
| 2012/0019149 | A1* | 1/2012 | Shih | H05B 47/105 |
| | | | | 315/149 |
| 2012/0231852 | A1* | 9/2012 | Forstall | H04M 1/72466 |
| | | | | 455/566 |
| 2012/0232836 | A1* | 9/2012 | Ohmi | G06F 3/0308 |
| | | | | 702/150 |
| 2013/0222514 | A1* | 8/2013 | Liu | H04M 1/605 |
| | | | | 348/14.01 |
| 2013/0249861 | A1* | 9/2013 | Chang | G06F 3/017 |
| | | | | 345/174 |
| 2014/0104241 | A1* | 4/2014 | Huppi | G06F 3/0418 |
| | | | | 345/178 |
| 2014/0110583 | A1 | 4/2014 | Wu | |
| 2014/0204044 | A1* | 7/2014 | Mak-Fan | G06F 3/0416 |
| | | | | 345/173 |
| 2015/0346897 | A1 | 12/2015 | Irri et al. | |
| 2016/0057578 | A1* | 2/2016 | Rouaissia | H03K 17/955 |
| | | | | 455/456.1 |
| 2016/0085338 | A1* | 3/2016 | Yasue | G06F 3/044 |
| | | | | 345/174 |
| 2016/0110051 | A1* | 4/2016 | Yuan | G06F 3/0484 |
| | | | | 345/173 |
| 2016/0150399 | A1* | 5/2016 | Zhang | G01S 17/04 |
| | | | | 455/418 |
| 2016/0154521 | A1* | 6/2016 | Park | G06F 1/3265 |
| | | | | 345/173 |
| 2016/0179265 | A1 | 6/2016 | Zeng | |

FOREIGN PATENT DOCUMENTS

| | | |
|---|---|---|
| CN | 103941310 | 7/2014 |
| CN | 104202480 | 12/2014 |
| CN | 105262882 | 1/2016 |
| CN | 105915717 | 8/2016 |
| CN | 105959461 | 9/2016 |
| CN | 106254661 | 12/2016 |

OTHER PUBLICATIONS

WIPO, ISR for PCT/CN2018/085677, Aug. 1, 2018.
IPI, Office Action for IN Application No. 201917046332, dated Feb. 16, 2021.

* cited by examiner

OFF-SCREEN CONTROL METHOD DETERMINING SIGNAL INTENSITY CALIBRATION VALUE FOR FILMED DISPLAY SCREEN

CROSS-REFERENCE TO RELATED APPLICATIONS

This application is a continuation application of International Application No. PCT/CN2018/085677, filed on May 4, 2018, which claims priority to Chinese Patent Application No. 201710343828.0, filed on May 16, 2017, the entire disclosures of which are incorporated herein by reference.

TECHNICAL FIELD

The present disclosure relates to the technology field of electronic devices, and more particularly to a screen-off control method and apparatus, a storage medium, and a terminal.

BACKGROUND

With the development of electronic device technology, electronic devices have gradually become a platform for running general software, instead of a device that simply provides call services. The platform no longer provides call management as the main purpose, but provides an operating environment for various application software including call managements, game entertainments, office notes, mobile payments, etc., which brings great convenience to user's work and life.

At present, distance sensors in the market have become standard built-in devices for electronic devices. During conversation between electronic devices, two parties of the conversation only need to communicate through voice. At this time, the display and the off of the screen are usually controlled according to the distance between the electronic device and the user's face. Specifically, whether the mobile phone is close to the face is judged by the infrared light emitted by the sensor. The LCD backlight can be turned off when the mobile phone is close to the face, to save power. At the same time, for a capacitive touch screen, accidental touch can be prevented.

SUMMARY

Implementations of the present disclosure provide a screen-off control method and apparatus, a storage medium, and a terminal.

In a first aspect, an implementation of the present disclosure provides a screen-off control method applied to a terminal. The screen-off control method includes the following. A signal intensity value reading operation is performed on a proximity sensor the number of times preset, to obtain a plurality of signal intensity values. An average intensity value of the plurality of signal intensity values is calculated, and it is determined whether a first difference value between the average intensity value and an initial intensity value of the proximity sensor is greater than a preset value. The first difference value is determined to be a signal intensity calibration value, in response to a determination that the first difference value is greater than the preset value. Screen-off control is performed according to the signal intensity calibration value and a screen-off threshold value.

In a second aspect, an implementation of the present disclosure further provides a screen-off control apparatus applied to a terminal, the screen-off control apparatus including an obtaining module, a calculating module, a first judging module, a determining module, and a control module. The obtaining module is configured to obtain a plurality of signal intensity values by performing a signal intensity value reading operation on a proximity sensor the number of times preset. The calculating module is configured to calculate an average intensity value of the plurality of signal intensity values. The first judging module is configured to determine whether a first difference value between the average intensity value and an initial intensity value of the proximity sensor is greater than a preset value. The determining module is configured to determine the first difference value to be a signal intensity calibration value, in response to a determination that the first difference value is greater than the preset value. The control module is configured to perform screen-off control according to the signal intensity calibration value and a screen-off threshold value.

In a third aspect, an implementation of the present disclosure further provides a non-transitory computer-readable storage medium. The non-transitory computer-readable storage medium is configured to store a plurality of instructions which, when executed by a processor, cause the processor to carry out the following actions. A signal intensity value reading operation is performed on a proximity sensor the number of times preset, to obtain a plurality of signal intensity values. An average intensity value of the plurality of signal intensity values is calculated, and it is determined whether a first difference value between the average intensity value and an initial intensity value of the proximity sensor is greater than a preset value. The first difference value is determined to be a signal intensity calibration value, in response to a determination that the first difference value is greater than the preset value. Screen-off control is performed according to the signal intensity calibration value and a screen-off threshold value.

In a fourth aspect, an implementation of the present disclosure provides a terminal, which includes a processor and a memory. The memory stores a plurality of instructions, and the processor loads the instructions stored in the memory to perform the following. A signal intensity value reading operation is performed on a proximity sensor the number of times preset, to obtain a plurality of signal intensity values. An average intensity value of the plurality of signal intensity values is calculated, and it is determined whether a first difference value between the average intensity value and an initial intensity value of the proximity sensor is greater than a preset value. The first difference value is determined to be a signal intensity calibration value, in response to a determination that the first difference value is greater than the preset value. Screen-off control is performed according to the signal intensity calibration value and a screen-off threshold value.

BRIEF DESCRIPTION OF THE DRAWINGS

In order to more clearly illustrate technical solutions in the implementations of the present disclosure, the accompanying drawings required for describing the implementations of the present disclosure will be briefly described below. It is obvious that the accompanying drawings in the following description only illustrate some implementations of the present disclosure. Those skilled in the art may also obtain other drawings based on these accompanying drawings without paying any creative efforts.

DETAILED DESCRIPTION

Referring to the drawings, the same component reference numerals represent the same components. The principles of the present disclosure are illustrated by the implementation in an appropriate computing environment. The following description is based on the specific implementations of the present disclose as illustrated, and should not be construed as limiting the other specific implementations that are not described herein.

In the following description, specific implementations of the present disclosure will be described with reference to symbols and steps executed by one or more computers, unless otherwise stated. Therefore, these steps and operations will be referred to several times to be executed by a computer. The computer execution referred to herein includes the operation of a computer processing unit that represents an electronic signal in data in a structured form. This operation converts the data or maintains it at a location in the computer's memory system, which can be reconfigured or otherwise altered in a manner well known to those skilled in the art. The data structure maintained by the data is the physical location of the memory, which has specific characteristics defined by the data format. However, the principles of the present disclosure are described in the above text, which is not intended to be a limitation, and those skilled in the art will appreciate that the various steps and operations described below can also be implemented in hardware.

The principles of the present disclosure are operated using many other general purpose or special purpose computing, communication environments, or configurations. Well-known examples suitable for computing systems, environments, and configurations of the present disclose may include, but are not limited to, hand-held phones, personal computers, servers, multi-processor systems, microcomputer-based systems, mainframe computers, and distributed computing environments, including any of the above systems or devices. At present, in actual use, in order to protect the display screen, users tend to paste film. The market conditions are various, and different users have different habits. Some users like to paste film, some users do not paste film, some users paste steel films, etc. Since there are transmitters and receivers inside the electronic device, if there is a film covering, it will inevitably increase the light intensity value measured by the receiver, which may directly cause screen-off, affecting the user's use.

Details will be described below.

This implementation will be described from the perspective of a screen-off control apparatus. The apparatus may be integrated into a terminal, and the terminal may be electronic devices such as mobile internet network devices (such as smart phones or tablets).

The implementation of the present disclosure provides a screen-off control method which includes: obtaining a plurality of signal intensity values by performing a signal intensity value reading operation on a proximity sensor the number of times preset; calculating an average intensity value of the plurality of signal intensity values, and determining whether a first difference value between the average intensity value and an initial intensity value of the proximity sensor is greater than a preset value; determining the first difference value to be a signal intensity calibration value, in response to a determination that the first difference value is greater than the preset value; and performing screen-off control according to the signal intensity calibration value and a screen-off threshold value.

In an implementation, the method further includes: determining, according to the average intensity value, whether a plurality of fluctuation amplitudes of the plurality of signal intensity values are less than a preset fluctuation amplitude; performing the action of determining whether the first difference value between the average intensity value and an initial intensity value of the proximity sensor is greater than the preset value, in response to a determination that the plurality of fluctuation amplitudes are less than the preset fluctuation amplitude.

In an implementation, the action of determining, according to the average intensity value, whether the plurality of fluctuation amplitudes of the plurality of signal intensity values are less than a preset fluctuation amplitude includes: obtaining a plurality of second difference values between the plurality of signal intensity values and the average intensity value respectively; calculating the plurality of fluctuation amplitudes according to the plurality of second difference values and the average intensity value; and determining whether the fluctuation amplitudes are less than the preset fluctuation amplitude.

In an implementation, the action of performing the screen-off control according to the signal intensity calibration value and the screen-off threshold value includes: obtaining a current signal intensity value measured by the proximity sensor; calibrating the current signal intensity value according to the signal intensity calibration value to obtain a target signal intensity value; and performing the screen-off control according to the target signal intensity value and the screen-off threshold value.

In an implementation, the action of performing the screen-off control according to the target signal intensity value and the screen-off threshold value includes: determining whether the target signal intensity value is greater than the screen-off threshold value; turning off a display screen of the terminal in response to a determination that the target signal intensity value is greater than the screen-off threshold value.

In an implementation, the method further includes the following after the screen is turned off: obtaining a screen-on threshold value, wherein the screen-on threshold value is less than the screen-off threshold value; obtaining the target signal intensity value again, and determining whether the target signal intensity value obtained again is less than the screen-on threshold; lighting the display screen in response to a determination that the target signal intensity value obtained again is less than the screen-on threshold.

In an implementation, the method further includes: determining whether the terminal is currently in a call state; performing the action of performing the screen-off control according to the signal intensity calibration value and the screen-off threshold in response to a determination that the electronic device is currently in the call state.

This implementation will be described from the perspective of a screen-off control apparatus, which may be specifically integrated in a terminal.

Figure 1:
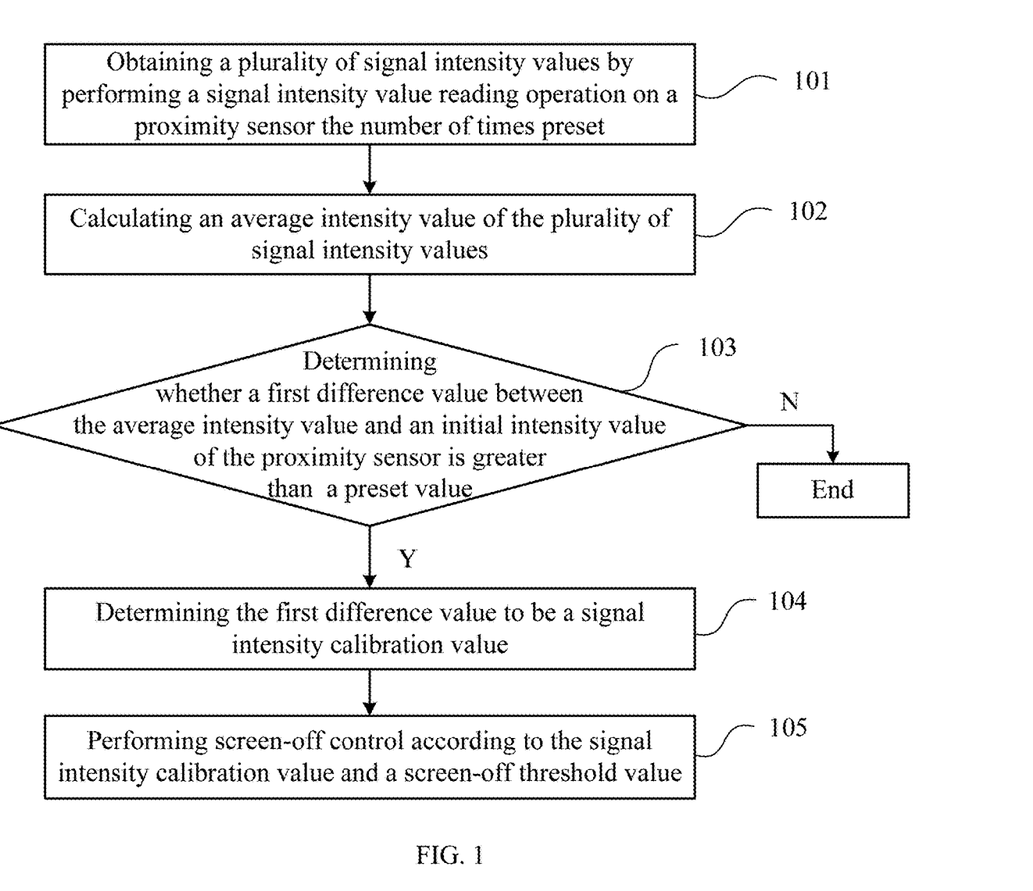
FIG. 1 is a schematic flowchart of a screen-off control method according to an implementation of the present disclosure.

Referring to FIG. 1, a schematic flowchart of a screen-off control method according to a first implementation of the present disclosure is illustrated. The screen-off control method of this implementation includes the following actions at blocks illustrated in FIG. 1.

At block 101, a signal intensity value reading operation is performed on a proximity sensor the number of times preset, to obtain a plurality of signal intensity values.

Specifically, there are many types of distance sensors, which are produced according to different principles and different methods. Different distance sensors use different ways to sense objects. For example, there are inductive proximity sensors, capacitive proximity sensors, and infrared proximity sensors, etc. In the implementation of the present disclosure, an infrared proximity sensor can be used in the electronic device. The proximity sensing of the sensor is implemented by the sensor detecting the amount of infrared energy to determine proximity or departure, where the infrared energy is emitted by an infrared light-emitting diode (IRLED), and blocked and reflected by an external block. The infrared proximity sensor usually includes an emission sensor, i.e. an LED lamp for emitting infrared light, and a receiving sensor for receiving infrared light.

When the electronic device leaves the factory, an intensity value of the proximity sensor in the electronic device will be calibrated near a fixed value, which is an initial intensity value of the proximity sensor. Generally speaking, if there is no occlusion, the initial intensity value of the proximity sensor will always show its initial value, and the data will be more stable. However, when a film is pasted on the surface of the screen, the read light intensity value will increase.

Figure 2:
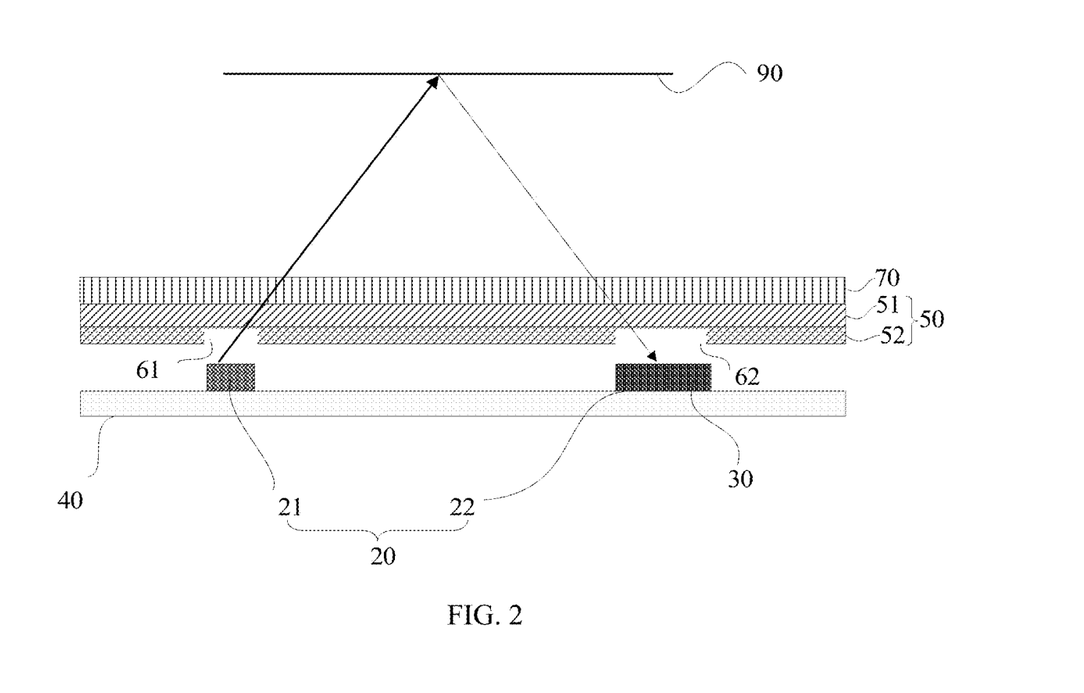
FIG. 2 is a schematic diagram of a proximity sensor according to an implementation of the present disclosure.

When an object approaches, there will be reflection of infrared light. Internal chip processor in the receiver includes an analog-to-digital converter to obtain a specific infrared light intensity value. In the absence of obstructions, the value in the receiver is the smallest. When the object keeps approaching, the value keeps increasing until reaching to a full scale. As illustrated in FIG. 2, a reference number 70 indicates a transparent substrate. A light-emitting sensor 21 and a light-receiving sensor 22 constitute a proximity sensor 20, which is arranged on the printed circuit board 40. Under the transparent substrate 70 is an ink layer 50 which may include a light-transmitting ink layer 51 and a light-shielding ink layer 52. The light-shielding ink layer 52 includes a first light-transmitting region 61 for emitting light and a second light-transmitting region 62 for receiving light. The approaching process is that the light-emitting sensor 21 generates infrared rays which are transmitted to outside through the first light-transmitting region 61, then the infrared rays are reflected by a blocking object 90 and pass through the second light-transmitting region 62 after hitting the blocking object 90, and are finally received by the light-receiving sensor 22.

Figure 3:
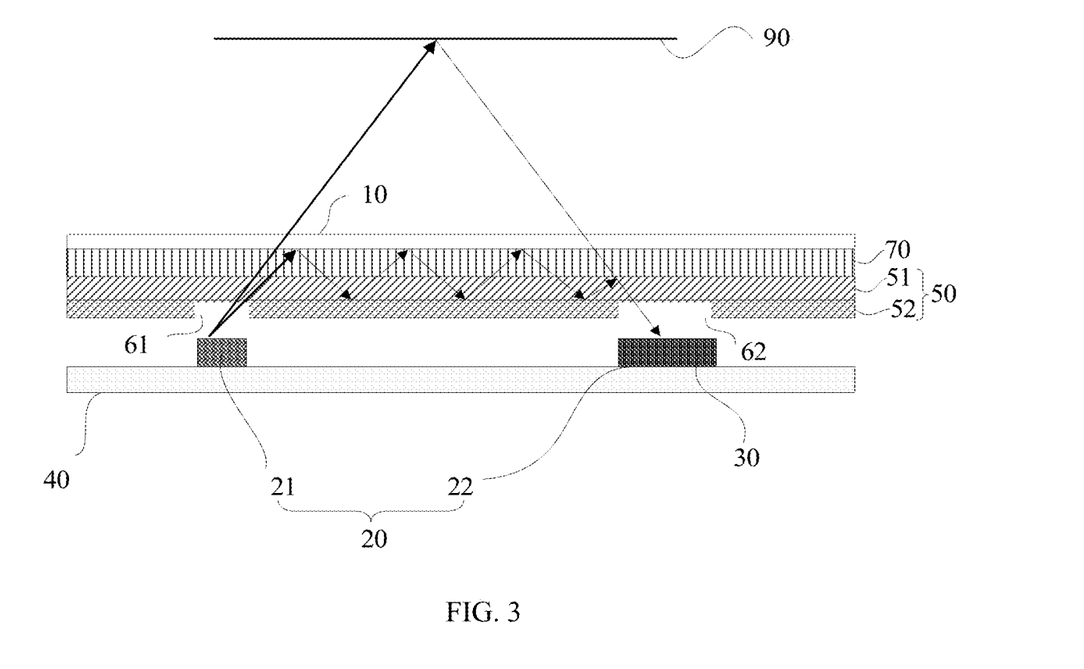
FIG. 3 is a schematic diagram of another proximity sensor according to an implementation of the present disclosure.

If the user pastes a film on the surface of the display screen, as illustrated in FIG. 3, the surface of the transparent substrate 70 is covered with a display film 10, such as a steel film. After being emitted from the light-emitting sensor 21 and transmitted to the film 10, a part of the infrared rays are reflected inside the electronic device, for example, through the ink layer 50, the transparent substrate 70, and the film 10, the part of the infrared rays are continuously reflected inside the electronic device, and are finally received by the light-receiving sensor 22. The part of reflected rays causes the light intensity value measured by the proximity sensor to be larger than an actual value, which affects the accuracy of the data. In addition, an ambient light sensor 30 can be arranged beside the light-receiving sensor 22 for sensing ambient light.

In the implementation of the present disclosure, the number of times preset can be set according to actual conditions, for example, the number of times preset is 50 times, and data is collected every 10 seconds, to obtain sampling data of the distance sensor in the electronic device for 50 consecutive times in 500 seconds. In the absence of obstructions, the data jumps very small, usually in single digits, such as reading values of 801, 805, and 803.

At block 102, an average intensity value of the plurality of signal intensity values is calculated.

In the implementation of the present disclosure, after the plurality of signal intensity values are obtained, all the values may be added up, and then divided by the number of the values to obtain the average intensity value of the plurality of signal intensity values. For example, in a preset time period, the light intensity value of the distance sensor is sampled n times to obtain n light intensity values such as $Q1, Q2, Q3, \ldots, Qn$, and $Q1+Q2+Q3+\ldots+Qn$ is calculated and a result is divided by n to obtain the average intensity value.

At block 103, it is determined whether a first difference value between the average intensity value and an initial intensity value of the proximity sensor is greater than a preset value. If the first difference value is greater than the preset value, the action at block 104 is performed. If the first difference value isn't greater than the preset value, the process is ended.

Specifically, in the implementation of the present disclosure, the light intensity value needs to be calibrated only when the average light intensity value is much greater than the initial intensity value of the proximity sensor. For example, the initial intensity value of the proximity sensor is 1000, and the preset value may be 500, that is, only when the average light intensity value is greater than 1000 and exceeds 500, that is, the average light intensity value is greater than 1500, the received light intensity value needs to be calibrated. If the average light intensity value isn't greater than 1500, no further processing is necessary.

At block 104, the first difference value is determined to be a signal intensity calibration value.

When it is determined that the first difference value between the average intensity value and the initial intensity value of the proximity sensor is greater than the preset value, the first difference value may be set as a calibration value. For example, if the first difference value is 500, the value can be written into a register, and the calibration value is subtracted from every subsequent sample read value. In this way, no matter what film is attached, how much the light intensity value is increased, it can be guaranteed that the light intensity value can be automatically calibrated to the factory value, that is, about 1000, which will not cause the problem that the screen is not bright.

At block 105, screen-off control is performed according to the signal intensity calibration value and a screen-off threshold value.

Specifically, in the using process of the electronic device by the user, the current light intensity value is obtained, and is calibrated according to the signal intensity calibration value, so as to obtain a final light intensity value, and then the screen-off control is performed according to the final light intensity value and the screen-off threshold value. For example, the screen-off threshold value is 1800. When the user answers a call, as the object approaches, the proximity data slowly increases. After exceeding the screen-off threshold value 1800, the screen-off threshold value is triggered, an interruption is generated, and the display screen is turned off. After the screen is turned off and the user finishes the call, the object moves away slowly. When the proximity value is less than 1800, a screen-on threshold value is triggered, an interruption is generated, and the screen is lit.

That is, in the implementation of the present disclosure, the action that the screen-off control is performed according to the signal intensity calibration value and the screen-off threshold value may specifically be implemented as follow.

A current signal intensity value measured by the proximity sensor is obtained.

The current signal intensity value is calibrated according to the signal intensity calibration value to obtain a target signal intensity value.

The screen-off control is performed according to the target signal intensity value and the screen-off threshold value.

In the implementation of the present disclosure, the action that the screen-off control is performed according to the target signal intensity value and the screen-off threshold value may specifically be implemented as follow. It is determined whether the target signal intensity value is greater than the screen-off threshold value. If the target signal intensity value is greater than the screen-off threshold value, the display screen of the terminal is turned off.

Further, the screen-off threshold value and the screen-on threshold value may also be set to be different. For example, the screen-on threshold value may be set to 1700 while the screen-off threshold value is set to 1800. After the light intensity value exceeds 1800 and the screen is turned off, it is further determined whether the current light intensity value is less than 1700, and if the current light intensity value is less than 1700, the display screen of the electronic device is lit.

In the implementation of the present disclosure, the screen-off control method further includes the following. A screen-on threshold value is obtained, where the screen-on threshold value is less than the screen-off threshold value. The target signal intensity value is obtained again, and it is determined whether the target signal intensity value obtained again is less than the screen-on threshold. If the target signal intensity value obtained again is less than the screen-on threshold, the screen of the terminal is lit.

Considering that the screen-off control method provided by the present disclosure is mostly used for an electronic device during a call, for example, when the user answers the call and places the electronic device near the ear, the screen is extinguished to prevent false touches. When the call ends and the electronic device is away from the user, the screen is lit again.

Therefore, in the implementation of the present disclosure, prior to the action that the screen-off control is performed according to the signal intensity calibration value and the screen-off threshold value, the method may further include the following.

It is determined whether the electronic device is currently in a call state.

If the electronic device is currently in the call state, the action that the screen-off control is performed according to the signal intensity calibration value and the screen-off threshold value is performed.

It can be seen that the screen-off control method provided by the implementation of the present disclosure can read the signal intensity value measured by the proximity sensor the number of times preset, to obtain the plurality of signal intensity values, calculate the average intensity value of the plurality of signal intensity values, and determine whether the first difference value between the average intensity value and the initial intensity value of the proximity sensor is greater than the preset value, if yes, determine the first difference value as the signal intensity calibration value, and perform the screen-off control according to the signal intensity calibration value and the screen-off threshold value. The solution can automatically calibrate the light intensity value measured by the distance sensor after the user pastes the film to the electronic device, and perform the screen-off control according to the calibrated light intensity value and the screen-off threshold value. Therefore, when the electronic device is subjected to interference such as the film pasting or the like, the screen of the electronic device is prevented from being abnormally splashed due to inaccurate reading data, thereby effectively improving the stability of the screen-off control.

Figure 4:
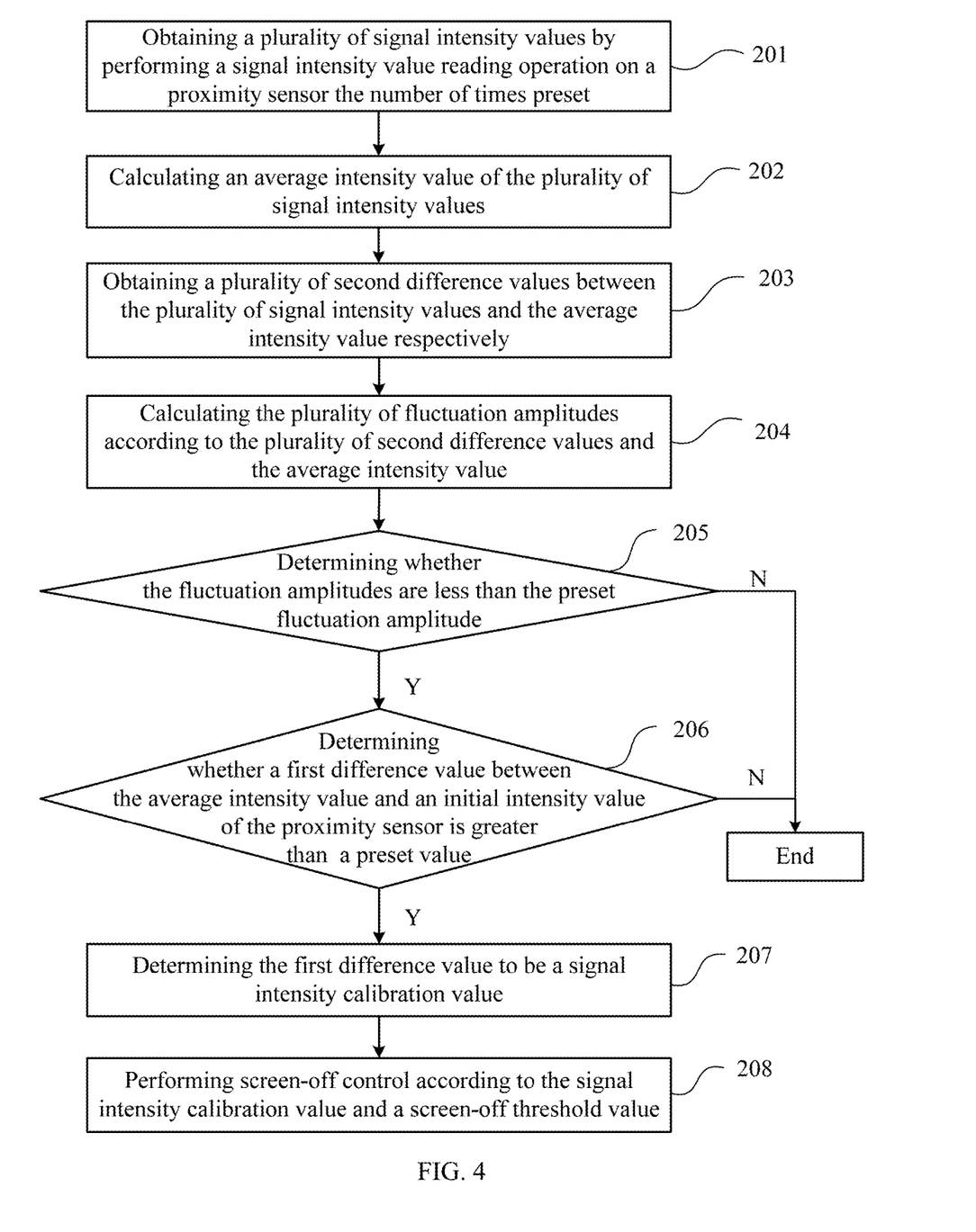
FIG. 4 is a schematic flowchart diagram of another screen-off control method according to an implementation of the present disclosure.

Further, referring to FIG. 4, a schematic flowchart diagram of another screen-off control method according to an implementation of the present disclosure is illustrated. The following actions are included.

At block 201, a signal intensity value reading operation is performed on a proximity sensor the number of times preset, to obtain a plurality of signal intensity values.

For example, an infrared proximity sensor can be used in the electronic device. The number of times preset can be 50 times, and data is collected every 10 seconds, to obtain sampling data of the distance sensor in the electronic device for 50 consecutive times in 500 seconds.

In other implementations, an inductive proximity sensor can also be used in the electronic device, which consists of an LC high frequency oscillator and an amplification processing circuit. When a metal object approaches an oscillating induction head which is capable of generating an electromagnetic field, an eddy current is generated inside the object. The eddy current reacts to the proximity sensor, so that oscillation ability of the proximity sensor is attenuated and the parameters of the internal circuit are changed, thereby obtaining the intensity value. However, the limitation of this type of sensor is that the object that can be detected must be a metal object.

In another implementation, a capacitive proximity sensor can also be used. A measuring head of the capacitive proximity sensor is usually used as one plate of a capacitor, and the other plate of the capacitor is the object itself. Dielectric constant between the object and the proximity sensor changes when the object moves toward the proximity sensor, making the state of the circuit connected to the measuring head also change, thereby obtaining the intensity value.

At block 202, an average intensity value of the plurality of signal intensity values is calculated.

For example, in a preset time period, the light intensity value of the distance sensor is sampled n times to obtain n light intensity values such as Q1, Q2, Q3, . . . , Qn, and Q1+Q2+Q3+ . . . +Qn is calculated and a result is divided by n to obtain the average intensity value.

At block 203, a plurality of second difference values between the plurality of signal intensity values and the average intensity value are obtained respectively.

Specifically, considering that in actual use, if a protective film is pasted to the display screen of a mobile phone, even if the received light intensity value of the distance sensor will be increased, In the absence of obstructions, the light intensity value will also be relatively stable in a period of time, so it is necessary to determine whether a film is currently pasted on the display screen of the electronic device. Specifically, after the average intensity value of the plurality of signal intensity values is calculated, it is determined whether fluctuation amplitudes of the plurality of signal intensity values are less than a preset fluctuation amplitude according to the average intensity value. If the fluctuation amplitudes are less than the preset fluctuation amplitude, it may be determined that the electronic device is currently in a stable state and can be further operated.

Specifically, the plurality of second difference values between the plurality of signal intensity values and the average intensity value are respectively obtained. For example, the average intensity value is 1600, and Q1-1600, Q2-1600, Q3-1600, . . . , Qn-1600, are calculated respectively, to obtained n second difference values.

At block 204, the plurality of fluctuation amplitudes are calculated according to the plurality of second difference values and the average intensity value.

It can be understood that after the second difference values are calculated according to the plurality of signal intensity values and the average intensity value, absolute value processing needs to be performed on the second difference values, and then the second differences can be divided by the average intensity value to obtain the fluctuation amplitudes.

At block 205, it is determined whether the fluctuation amplitudes are less than the preset fluctuation amplitude. If the fluctuation amplitudes are less than the preset fluctuation amplitude, the action at block 206 is performed. If the fluctuation amplitudes aren't less than the preset fluctuation amplitude, the process is ended.

For example, the preset fluctuation amplitude can be set to 20%, and as long as the fluctuation amplitude is less than 20%, it is considered to be in a stable state.

At block 206, it is determined whether a first difference value between the average intensity value and an initial intensity value of the proximity sensor is greater than a preset value. If the first difference value is greater than the preset value, the action at block 207 is performed. If the first difference value isn't greater than the preset value, the process is ended.

For example, the initial intensity value of the proximity sensor is 1000, and the preset value may be 500, that is, only when the average light intensity value is greater than 1000 and exceeds 500, that is, the average light intensity value is greater than 1500, the received light intensity value needs to be calibrated.

At block 207, the first difference value is determined to be a signal intensity calibration value.

For example, if the first difference value is 500, the value can be written into a register, and the calibration value is subtracted from every subsequent sample read value, to obtain the final light intensity value.

At block 208, screen-off control is performed according to the signal intensity calibration value and a screen-off threshold value.

Specifically, in the process of user using the electronic device, the current light intensity value is obtained, and is calibrated according to the signal intensity calibration value, so as to obtain a final light intensity value, and then the screen-off control is performed according to the final light intensity value and the screen-off threshold value.

It can be seen that the screen-off control method provided by the implementation of the present disclosure can read the signal intensity value measured by the proximity sensor the number of times preset, to obtain the plurality of signal intensity values, calculate the average intensity value of the plurality of signal intensity values, obtain the plurality of second difference values between the plurality of signal intensity values and the average intensity value, respectively, calculate the plurality of fluctuation amplitudes according to the plurality of second difference values and the average intensity value, and determine whether the fluctuation amplitudes are less than the preset fluctuation amplitude, if yes, determine whether the first difference value between the average intensity value and the initial intensity value of the proximity sensor is greater than the preset value, if yes, determine the first difference value as the signal intensity calibration value, and perform the screen-off control according to the signal intensity calibration value and the screen-off threshold value. The solution can automatically calibrate the light intensity value measured by the distance sensor after the user pastes the film on the electronic device, and perform the screen-off control according to the calibrated light intensity value and the screen-off threshold value. Therefore, when the electronic device is subjected to interference such as the film pasting or the like, the screen of the electronic device is prevented from being abnormally splashed due to inaccurate reading data, thereby effectively improving the stability of the screen-off control.

The implementation of the present disclosure further provides a screen-off control apparatus, which includes an obtaining module, a calculating module, a first judging module, a determining module, and a controlling module. The obtaining module is configured to obtain a plurality of signal intensity values by performing a signal intensity value reading operation on a proximity sensor the number of times preset. The calculating module is configured to calculate an average intensity value of the plurality of signal intensity values. The first judging module is configured to determine whether a first difference value between the average intensity value and an initial intensity value of the proximity sensor is greater than a preset value. The determining module is configured to determine the first difference value to be a signal intensity calibration value, in response to a determination that the first difference value is greater than the preset value. The control module is configured to perform screen-off control according to the signal intensity calibration value and a screen-off threshold value.

In an implementation, the apparatus further includes a second judging module. The second judging module is configured to determine, according to the average intensity value, whether a plurality of fluctuation amplitudes of the plurality of signal intensity values are less than a preset fluctuation amplitude. The first judging module is configured to determine whether the first difference value between the average intensity value and an initial intensity value of the proximity sensor is greater than the preset value, in response to a determination that the plurality of fluctuation amplitudes are less than the preset fluctuation amplitude.

In an implementation, the second judging module includes an obtaining sub-module, a calculating sub-module, and a judging sub-module. The obtaining sub-module is configured to obtain a plurality of second difference values between the plurality of signal intensity values and the average intensity value respectively. The calculating submodule is configured to calculate the plurality of fluctuation amplitudes according to the plurality of second difference values and the average intensity value. The determining sub-module is configured to determine whether the fluctuation amplitudes are less than the preset fluctuation amplitude.

In an implementation, the control module is configured to obtain a current signal intensity value measured by the proximity sensor; calibrate the current signal intensity value according to the signal intensity calibration value to obtain a target signal intensity value; and perform the screen-off control according to the target signal intensity value and the screen-off threshold value.

In an implementation, the apparatus further includes a third judging module. The third judging module is configured to determine whether the terminal is currently in a call state. The control module is configured to perform the screen-off control according to the signal intensity calibration value and the screen-off threshold in response to a determination that the electronic device is currently in the call state.

In order to facilitate the implementation of the screen-off control method provided by the implementation of the present disclosure, the implementation of the present disclosure further provides an apparatus based on the above-described screen-off control method. The meanings of the nouns are the same as those described in the above-mentioned screen-off control method. The details of the specific implementation can be referred to the description in the method implementation.

Figure 5:
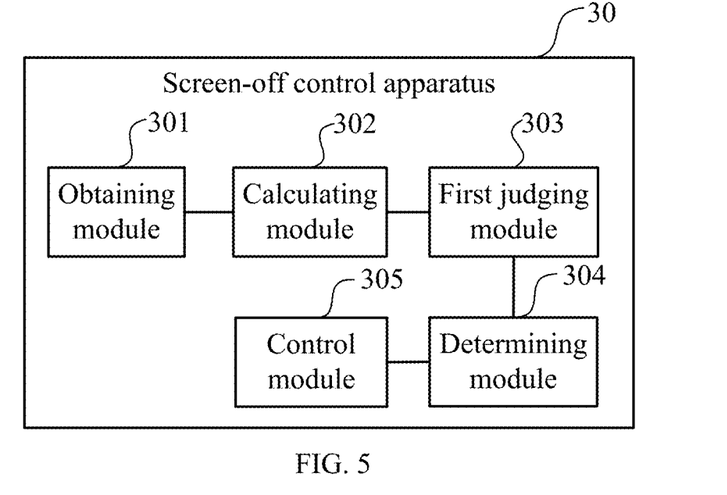
FIG. 5 is a schematic structural diagram of a screen-off control apparatus according to an implementation of the present disclosure.

Referring to FIG. 5, a schematic structural diagram of a screen-off control apparatus 30 according to an implementation of the present disclosure is illustrated. The apparatus 30 includes an obtaining module 301, a calculating module 302, a first judging module 303, a determining module 304, and a control module 305.

The obtaining module 301 is configured to obtain a plurality of signal intensity values by performing a signal intensity value reading operation on a proximity sensor the number of times preset.

The calculating module 302 is configured to calculate an average intensity value of the plurality of signal intensity values.

The first judging module 303 is configured to determine whether a first difference value between the average intensity value and an initial intensity value of the proximity sensor is greater than a preset value.

The determining module 304 is configured to determine the first difference to be a signal intensity calibration value, when the first judging module 303 determines that the first difference value is greater than the preset value.

The control module 305 is configured to perform screen-off control according to the signal intensity calibration value and a screen-off threshold value.

Figure 6:
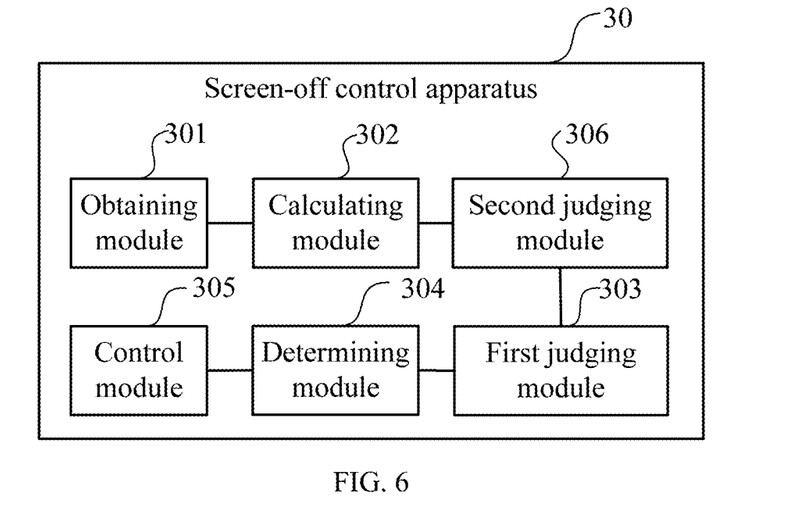
FIG. 6 is a schematic structural diagram of another screen-off control apparatus according to an implementation of the present disclosure.

In an implementation, as illustrated in FIG. 6, in the screen-off control apparatus 30, the apparatus may further include a second judging module 306.

After the calculating module 302 calculates the average intensity values of the plurality of signal intensity values, and before the first judging module 303 determines whether the first difference value between the average intensity value and the initial intensity value of the proximity sensor is greater than the preset value, the second judging module 306 is configured to determine whether a plurality of fluctuation amplitudes of the plurality of signal intensity values are less than a preset fluctuation amplitude according to the average intensity value.

The first judging module 303 is specifically configured to perform the action of determining whether the first difference between the average intensity value and the initial intensity value of the proximity sensor is greater than the preset value, when the second judging module 306 determines that the fluctuation amplitudes are less than the preset fluctuation amplitude.

Figure 7:
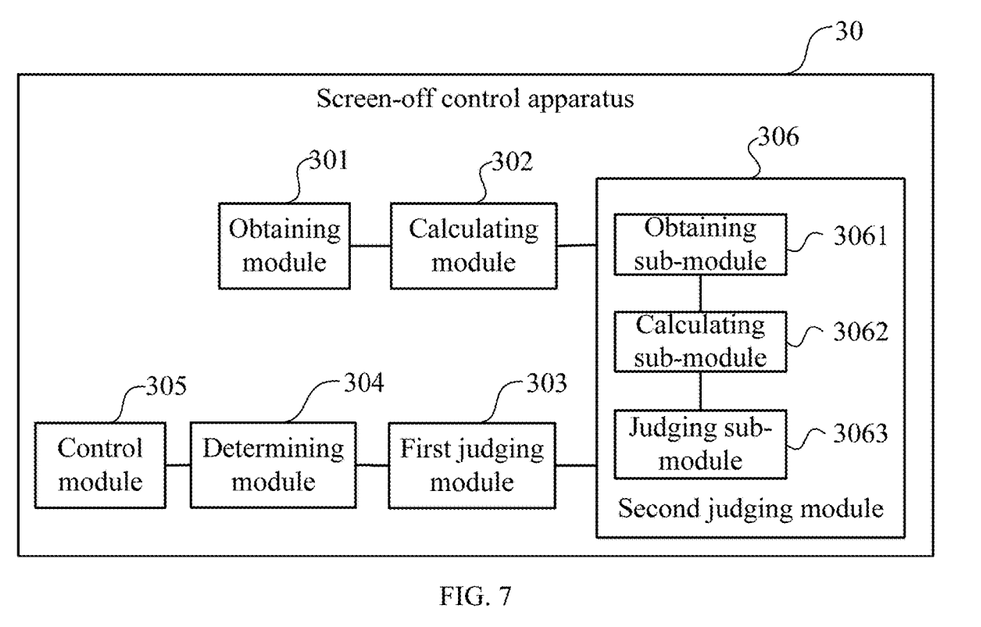
FIG. 7 is a schematic structural diagram of still another screen-off control apparatus according to an implementation of the present disclosure.

In an implementation, as illustrated in FIG. 7, the second judging module 306 may specifically include an obtaining sub-module 3061, a calculating sub-module 3062, and a judging sub-module 3063.

The obtaining sub-module 3061 is configured to obtain a plurality of second difference values between the plurality of signal intensity values and the average intensity value respectively.

The calculating sub-module 3062 is configured to calculate the plurality of fluctuation amplitudes according to the plurality of second difference values and the average intensity value.

The judging sub-module 3063 is configured to determine whether the fluctuation amplitudes are less than the preset fluctuation amplitude.

It should be noted that, for technical details that are not described in detail in this implementations, references may be made to the screen-off control method provided by any foregoing implementation of the present disclosure.

It can be seen that according to the screen-off control apparatus provided by the implementation of the present disclosure, the obtaining module 302 reads the signal intensity value measured by the proximity sensor the number of times preset, to obtain the plurality of signal intensity values, the calculating module 302 calculates the average intensity value of the plurality of signal intensity values, and the first judging module 303 determines whether the first difference value between the average intensity value and the initial intensity value of the proximity sensor is greater than the preset value. If yes, the determining module 304 determines the first difference value as the signal intensity calibration value, and the control module 305 performs the screen-off control according to the signal intensity calibration value and the screen-off threshold value. The solution can automatically calibrate the light intensity value measured by the distance sensor after the user pastes the film to the electronic device, and perform the screen-off control according to the calibrated light intensity value and the screen-off threshold value. Therefore, when the electronic device is subjected to interference such as the film pasting or the like, the screen of the electronic device is prevented from being abnormally splashed due to inaccurate reading data, thereby effectively improving the stability of the screen-off control.

The present disclosure further provides a non-transitory computer readable storage medium, on which a plurality of instructions are stored. The instructions are configured to be loaded by a processor to perform the screen-off control method described above.

Specifically, when executed by the processor, the instructions cause the processor to obtain a plurality of signal intensity values by performing a signal intensity value reading operation on a proximity sensor the number of times preset; calculate an average intensity value of the plurality of signal intensity values, and determining whether a first difference value between the average intensity value and an initial intensity value of the proximity sensor is greater than a preset value; determine the first difference value to be a signal intensity calibration value, in response to a determination that the first difference value is greater than the preset value; and perform screen-off control according to the signal intensity calibration value and a screen-off threshold value.

It should be noted that, for technical details that are not described in detail in this implementations, references may be made to the screen-off control method provided by any foregoing implementation of the present disclosure.

The present disclosure further provides a terminal, which may be an electronic device such as a tablet computer or a mobile phone. A processor in the electronic device loads instructions corresponding to processes of one or more applications into a memory according to the following steps, and the processor runs the applications stored in the memory to implement various functions.

A signal intensity value measured by a proximity sensor is read the number of times preset, to obtain a plurality of signal intensity values. An average intensity value of the plurality of signal intensity values is calculated, and it is determined whether a first difference value between the average intensity value and an initial intensity value of the proximity sensor is greater than a preset value. The first difference value is determined to be a signal intensity calibration value, in response to a determination that the first difference value is greater than the preset value. Screen-off control is performed according to the signal intensity calibration value and a screen-off threshold value.

In an implementation, the instructions further cause the processor to: determine, according to the average intensity value, whether a plurality of fluctuation amplitudes of the plurality of signal intensity values are less than a preset fluctuation amplitude; perform the action of determining whether the first difference value between the average intensity value and an initial intensity value of the proximity sensor is greater than the preset value, in response to a determination that the plurality of fluctuation amplitudes are less than the preset fluctuation amplitude.

In an implementation, the instructions causing the processor to determine, according to the average intensity value, whether the plurality of fluctuation amplitudes of the plurality of signal intensity values are less than a preset fluctuation amplitude further cause the processor to: obtain a plurality of second difference values between the plurality of signal intensity values and the average intensity value respectively; calculate the plurality of fluctuation amplitudes according to the plurality of second difference values and the average intensity value; and determine whether the fluctuation amplitudes are less than the preset fluctuation amplitude.

In an implementation, the instructions causing the processor to perform the screen-off control according to the signal intensity calibration value and the screen-off threshold value further cause the processor to: obtain a current signal intensity value measured by the proximity sensor; calibrate the current signal intensity value according to the signal intensity calibration value to obtain a target signal intensity value; and perform the screen-off control according to the target signal intensity value and the screen-off threshold value.

In an implementation, the instructions causing the processor to perform the screen-off control according to the target signal intensity value and the screen-off threshold value further cause the processor to: determine whether the target signal intensity value is greater than the screen-off threshold value; turn off a display screen of the terminal in response to a determination that the target signal intensity value is greater than the screen-off threshold value.

In an implementation, the instructions further cause the processor to perform the following after the screen is turned off: obtaining a screen-on threshold value, wherein the screen-on threshold value is less than the screen-off threshold value; obtaining the target signal intensity value again, and determining whether the target signal intensity value obtained again is less than the screen-on threshold; lighting the display screen in response to a determination that the target signal intensity value obtained again is less than the screen-on threshold.

In an implementation, the instructions further cause the processor to: determine whether the terminal is currently in a call state; perform the action of performing the screen-off control according to the signal intensity calibration value and the screen-off threshold in response to a determination that the electronic device is currently in the call state.

Figure 8:
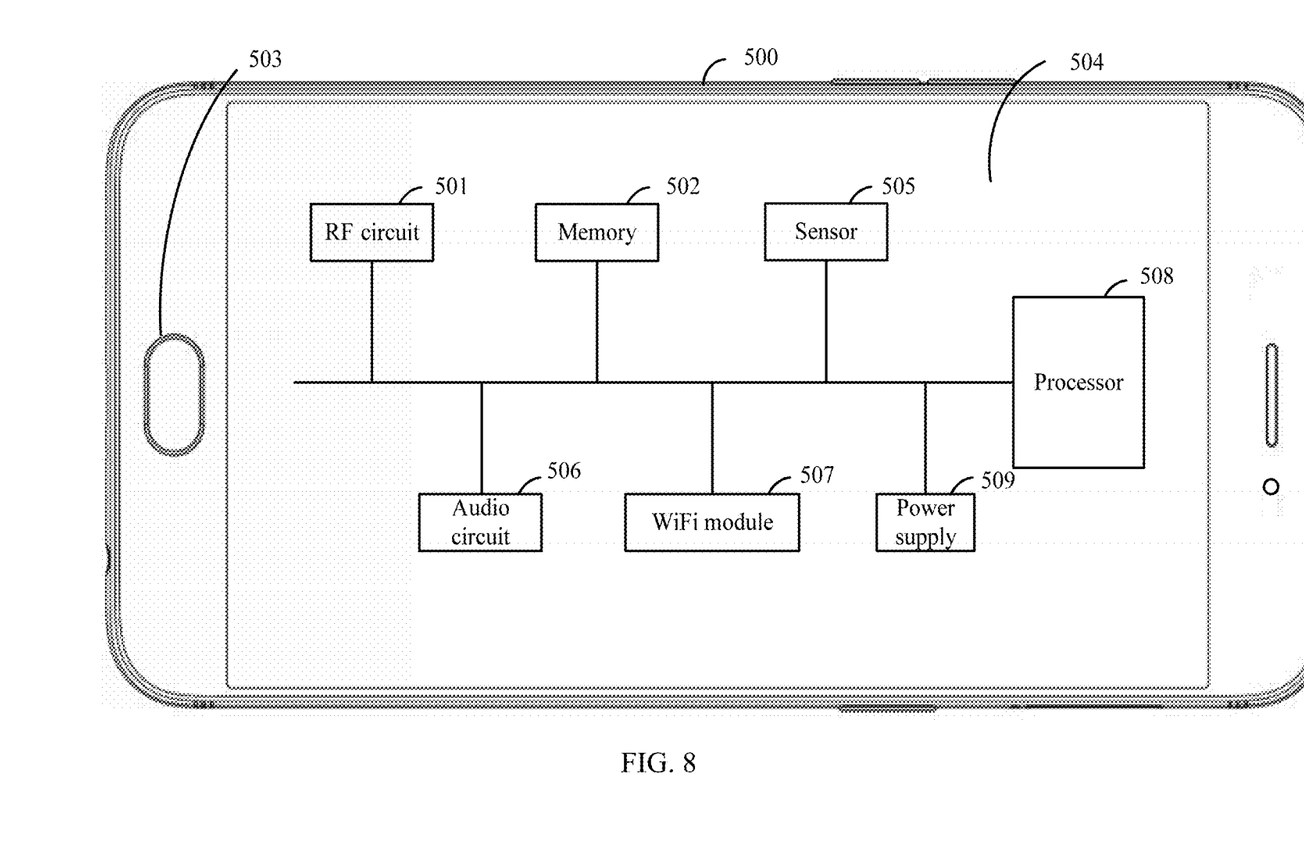
FIG. 8 is a schematic structural diagram of a terminal according to an implementation of the present disclosure.

Referring to FIG. 8, a schematic structural diagram of a terminal according to an implementation of the present disclosure is illustrated. The terminal 500 may include a radio frequency (RF) circuit 501, a memory 502 including one or more computer readable storage media, an input unit 503, a display unit 504, a sensor 505, an audio circuit 506, and wireless fidelity (WiFi) module 507, a processor 508 including one or more processing cores, a power supply 509, and the like. It can be understood by those skilled in the art that the structure of the electronic device illustrated in FIG. 8 does not constitute a limitation to the electronic device, and the electronic device may include more or less components than those illustrated, or a combination of certain components, or different component arrangements.

The RF circuit 501 can be used for transmitting and receiving information, or receiving and transmitting signals during a call. Specifically, after receiving downlink information of a base station, the RF circuit 501 transmits the downlink information to one or more processors 508 for processing. In addition, the RF circuit 501 transmits related uplink data to the base station. Generally, the RF circuit 501 includes, but is not limited to, an antenna, at least one amplifier, a tuner, one or more oscillators, a subscriber identity module (SIM) card, a transceiver, a coupler, and a low noise amplifier (LNA), a duplexer, etc. In addition, the RF circuit 501 can also communicate with the network and other devices through wireless communication. The wireless communication can use any communication standard or protocol, including but not limited to global system of mobile communication (GSM), general packet radio service (GPRS), and code division multiple access (CDMA), wideband code division multiple access (WCDMA), long term evolution (LTE), e-mail, short messaging service (SMS), and the like.

The memory 502 can be used to store applications and data. The applications stored in the memory 502 contain executable codes. Applications can form various functional modules. The processor 508 executes various functional applications and data processing by running the applications stored in the memory 502. For example, the memory 502 stores a plurality of instructions thereon, which when executed by the processor 508, cause the processor 508 to perform the screen-off control method described above. It should be noted that, for technical details that are not described in detail in this implementations, references may be made to the screen-off control method provided by any foregoing implementation of the present disclosure. The memory 502 may mainly include a storage program area and a storage data area, where the storage program area may store an operating system, an application required for at least one function (such as a sound playing function, an image playing function, etc.), and the like. The storage data area may store data, such as audio data, phone books, etc., which are created according to the use of the electronic devices. Moreover, the memory 502 may include a high speed random access memory, and may also include a non-volatile memory, such as at least one magnetic disk storage device, flash memory device, or other volatile solid state storage devices. Correspondingly, the memory 502 may also include a memory controller to provide access to memory 502 by the processor 508 and the input unit 503.

The input unit 503 can be configured to receive input digital, character information or user characteristic information (such as fingerprints), as well as generate keyboard, mouse, joystick, optical or trackball signal inputs related to user settings and function controls. Specifically, in a specific implementation, the input unit 503 can include touch-sensitive surfaces and other input devices. The touch-sensitive surfaces, also known as touch screens or touch panels, can collect user's touch operations on or near the touch-sensitive surfaces (e.g., the user uses any suitable object or accessory such as a finger, a stylus, etc., to operate on or near the touch-sensitive surface), and drive corresponding connecting devices according to preset programs. Alternatively, the touch sensitive surface may include two parts: a touch detection device and a touch controller. Where, the touch detection device detects the touch orientations of the user, and detects signals brought by the touch operations, and transmits the signals to the touch controller. The touch controller receives touch information from the touch detection device, converts the touch information into contact coordinates, sends the contact coordinates to the processor 508, and may receive commands from the processor 508 and execute them. In addition, the touch-sensitive surfaces can be implemented in a variety of types, including resistive, capacitive, infrared, surface acoustic waves, and the like. Besides the touch-sensitive surface, the input unit 503 can further include other input devices. Specifically, the other input devices may include, but are not limited to, one or more of the following: a physical keyboard, function keys (such as a volume control button, a switch button, etc.), a fingerprint recognition module, a trackball, a mouse, a joystick, and the like.

The display unit 504 can be used to display information entered by the user or information provided to the user as well as various graphical user interfaces of the electronic device, where the graphical user interfaces can be constructed from graphics, text, icons, video, and any combination thereof. The display unit 504 can include a display panel. Optionally, the display panel can be configured in the form of a liquid crystal display (LCD), an organic light-emitting diode (OLED), or the like. Further, the touch-sensitive surface can cover the display panel. When the touch-sensitive surface detects a touch operation on or near it, the touch-sensitive surface transmits the touch operation to the processor 508 to determine the type of a touch event, and then the processor 508 displays a corresponding visual output on the display panel according to the type of the touch event. Although in FIG. 8, the touch-sensitive surface and display panel are implemented as two separate components to perform input and input functions, in some implementations, the touch-sensitive surface can be integrated with the display panel to implement the input and output functions.

The electronic device can also include at least one type of sensor 505, such as a light sensor, a motion sensor, and other sensors. Specifically, the light sensor may include an ambient light sensor and a proximity sensor, where the ambient light sensor may adjust the brightness of the display panel according to the brightness of the ambient light, and the proximity sensor may turn off the display panel and/or backlight when the electronic device moves to the ear. As a kind of motion sensor, a gravity acceleration sensor can detect the acceleration in all directions (generally three axes). When it is stationary, it can detect the magnitude and direction of gravity. It can be used to identify the attitude applications of the mobile phone (such as horizontal and vertical screen switching, related games, magnetometer attitude calibration), vibration recognition related functions (such as pedometer, tapping), etc. The electronic device can also be configured with other sensors, such as gyroscopes, barometers, hygrometers, thermometers, infrared sensors, and the like, which are not described herein.

The audio circuit 506 can provide an audio interface between the user and the electronic device through a speaker and a microphone. The audio circuit 506 can convert the received audio data into an electrical signal, which is transmitted to a speaker, and converted into a sound signal output by the speaker. On the other hand, the microphone converts the collected sound signal into an electrical signal, which is received and converted into audio data by the audio circuit 506. Then the audio data is output to the processor 508 and processed by the processor 508, and transmitted via the RF circuit 501 to, for example, another electronic device, or the audio data is output to the memory 502 for further processing. The audio circuit 506 may also include an earphone jack to provide communication of the peripheral earphones with the electronic device.

WiFi is a short-distance wireless transmission technology. The electronic device can help users send and receive e-mail, browse web pages and access streaming media through the WiFi module 507, which provides users with wireless broadband Internet access. Although FIG. 8 illustrates the WiFi module 507, it can be understood that it does not belong to the essential configuration of the electronic device, and may be omitted as needed within the scope of not changing the essence of the invention.

The processor 508 is a control center of the electronic device, and connects various parts of the entire electronic device using various interfaces and lines. The processor 508 performs various functions and processes data of the electronic device by running or executing applications stored in the memory 502 and calling data stored in the memory 502, thereby realizing the overall monitoring of the electronic device. Optionally, the processor 508 may include one or more processing cores. Preferably, the processor 508 may integrate an application processor and a modem processor, where the application processor mainly processes an operating system, a user interface, an application, and the like. The modem processor primarily handles wireless communications. It will be appreciated that the above described modem processor may also not be integrated into the processor 508.

The electronic device further includes a power supply 509 (such as a battery) that supplies power to various components. Preferably, the power supply can be logically coupled to the processor 508 through a power management system, to manage functions such as charging, discharging, and power management through the power management system. The power supply 509 may also include any one or more of DC or AC power sources, recharging systems, power failure detection circuits, power converters or inverters, power status indicator, and the like.

Although not illustrated in FIG. 8, the electronic device may further include a camera, a Bluetooth module, and the like, and details are not described herein again.

For the specific implementation, the foregoing modules may be implemented as independent entities, or may be implemented in any combination, and may be implemented as the same or a plurality of entities. The specific implementation of the foregoing modules can be referred to the foregoing method implementations, and details are not described herein again.

It should be noted that those skilled in the art can understand that all or part of the steps in the various methods of the foregoing implementations can be accomplished by programs instructing related hardware. The programs can be stored in a computer readable storage medium, such as in a memory of the electronic device, and executed by at least one processor in the electronic device. A flow of an implementation such as the screen-off control method may be included during execution process. The storage medium may include a read only memory (ROM), a random access memory (RAM), a magnetic disk, an optical disk, and so on.

The above is a detailed description of a screen-off control method and apparatus, a storage medium and an electronic device provided by the implementations of the present disclosure. Each functional module may be integrated into a processing chip, or each module may exist physically separately, or two or more modules may be integrated in one module. The above integrated modules can be implemented either in the form of hardware or in the form of software functional modules. Specific examples are applied in this paper to explain the principles and implementations of the present disclosure. The description of the above implementations is only for helping to understand the method of the present disclosure and its core ideas. Meanwhile, for those skilled in the art, according to the ideas of the present disclosure, there will be changes in the specific implementation and application scope. In summary, the contents of this specification should not be construed as restrictions on the present disclosure.

What is claimed is:

1. A screen-off control method performed by a terminal which comprises a proximity sensor, the screen-off control method comprising:
    obtaining a plurality of signal intensity values by performing a signal intensity value reading operation on the proximity sensor a preset number of times in a period of time;
    calculating an average intensity value of the plurality of signal intensity values;
    determining whether the terminal is in a stable state according to the average intensity value and the plurality of signal intensity values;
    determining whether a first difference value between the average intensity value and an initial intensity value of the proximity sensor is greater than a preset value, in response to a determination that the terminal is in the stable state;
    determining that a display screen of the terminal is provided with a film and determining the first difference value to be a signal intensity calibration value, in response to a determination that the first difference value is greater than the preset value; and
    performing screen-off control according to a current signal intensity value measured by the proximity sensor, the signal intensity calibration value, and a screen-off threshold value;
    wherein determining whether the terminal is in the stable state according to the average intensity value and the plurality of signal intensity values comprises:
        determining, according to the average intensity value, whether each of a plurality of fluctuation amplitudes of the plurality of signal intensity values is less than a preset fluctuation amplitude; and
        determining that the terminal is in the stable state, in response to a determination that each of the plurality of fluctuation amplitudes is less than the preset fluctuation amplitude.

2. The screen-off control method of claim 1, wherein determining, according to the average intensity value, whether each of the plurality of fluctuation amplitudes of the plurality of signal intensity values is less than a preset fluctuation amplitude comprises:
    obtaining a plurality of second difference values between the plurality of signal intensity values and the average intensity value respectively;
    calculating the plurality of fluctuation amplitudes according to the plurality of second difference values and the average intensity value; and
    determining whether each of the fluctuation amplitudes is less than the preset fluctuation amplitude.

3. The screen-off control method of claim 1, wherein performing the screen-off control according to the current signal intensity value measured by the proximity sensor, the signal intensity calibration value, and the screen-off threshold value comprises:
    obtaining the current signal intensity value measured by the proximity sensor;
    calibrating the current signal intensity value according to the signal intensity calibration value to obtain a target signal intensity value; and
    performing the screen-off control according to the target signal intensity value and the screen-off threshold value.

4. The screen-off control method of claim 3, wherein performing the screen-off control according to the target signal intensity value and the screen-off threshold value comprises:
    determining whether the target signal intensity value is greater than the screen-off threshold value; and
    turning off a display screen of the terminal in response to a determination that the target signal intensity value is greater than the screen-off threshold value.

5. The screen-off control method of claim 4, wherein the method further comprises:
    obtaining a screen-on threshold value after the display screen is turned off, wherein the screen-on threshold value is less than the screen-off threshold value;
    obtaining the target signal intensity value again, and determining whether the target signal intensity value obtained again is less than the screen-on threshold; and
    lighting the display screen in response to a determination that the target signal intensity value obtained again is less than the screen-on threshold.

6. The screen-off control method of claim 1, wherein the method further comprises:
    determining whether the terminal is currently in a call state; and
    performing an action of performing the screen-off control according to the current signal intensity value measured by the proximity sensor, the signal intensity calibration value, and the screen-off threshold in response to a determination that the terminal is currently in the call state.

7. A non-transitory computer-readable storage medium storing a plurality of instructions which, when executed by a processor, cause the processor to:

obtain a plurality of signal intensity values by performing a signal intensity value reading operation on a proximity sensor of a terminal a preset number of times in a period of time;
calculate an average intensity value of the plurality of signal intensity values;
determine whether the terminal is in a stable state according to the average intensity value and the plurality of signal intensity values;
determine whether a first difference value between the average intensity value and an initial intensity value of the proximity sensor is greater than a preset value, in response to a determination that the terminal is in the stable state;
determine that a display screen of the terminal is provided with a film and determine the first difference value to be a signal intensity calibration value, in response to a determination that the first difference value is greater than the preset value; and
perform screen-off control according to a current signal intensity value measured by the proximity sensor, the signal intensity calibration value, and a screen-off threshold value;
wherein the instructions causing the processor to determine whether the terminal is in the stable state according to the average intensity value and the plurality of signal intensity values further cause the processor to:
determine, according to the average intensity value, whether each of a plurality of fluctuation amplitudes of the plurality of signal intensity values is less than a preset fluctuation amplitude; and
determine that the terminal is in the stable state, in response to a determination that each of the plurality of fluctuation amplitudes is less than the preset fluctuation amplitude.

8. The non-transitory computer-readable storage medium of claim 7, wherein the instructions causing the processor to determine, according to the average intensity value, whether each of the plurality of fluctuation amplitudes of the plurality of signal intensity values is less than a preset fluctuation amplitude further cause the processor to:
obtain a plurality of second difference values between the plurality of signal intensity values and the average intensity value respectively;
calculate the plurality of fluctuation amplitudes according to the plurality of second difference values and the average intensity value; and
determine whether each of the fluctuation amplitudes is less than the preset fluctuation amplitude.

9. The non-transitory computer-readable storage medium of claim 7, wherein the instructions causing the processor to perform the screen-off control according to the current signal intensity value measured by the proximity sensor, the signal intensity calibration value, and the screen-off threshold value further cause the processor to:
obtain the current signal intensity value measured by the proximity sensor;
calibrate the current signal intensity value according to the signal intensity calibration value to obtain a target signal intensity value; and
perform the screen-off control according to the target signal intensity value and the screen-off threshold value.

10. The non-transitory computer-readable storage medium of claim 9, wherein the instructions causing the processor to perform the screen-off control according to the target signal intensity value and the screen-off threshold value further cause the processor to:
determine whether the target signal intensity value is greater than the screen-off threshold value;
turn off a display screen of the terminal in response to a determination that the target signal intensity value is greater than the screen-off threshold value;
wherein the instructions further cause the processor to:
obtain a screen-on threshold value after the display screen is turned off, wherein the screen-on threshold value is less than the screen-off threshold value;
obtain the target signal intensity value again, and determine whether the target signal intensity value obtained again is less than the screen-on threshold; and
light the display screen in response to a determination that the target signal intensity value obtained again is less than the screen-on threshold.

11. The non-transitory computer-readable storage medium of claim 7, wherein the instructions further cause the processor to:
determine whether the terminal is currently in a call state; and
perform the screen-off control according to the current signal intensity value measured by the proximity sensor, the signal intensity calibration value and the screen-off threshold in response to a determination that the terminal is currently in the call state.

12. A terminal comprising:
a proximity sensor;
a processor; and
a memory storing a plurality of instructions thereon, which when executed by the processor, cause the processor to:
obtain a plurality of signal intensity values by performing a signal intensity value reading operation on the proximity sensor a preset number of times in a period of time;
calculate an average intensity value of the plurality of signal intensity values;
determine whether the terminal is in a stable state according to the average intensity value and the plurality of signal intensity values;
determine whether a first difference value between the average intensity value and an initial intensity value of the proximity sensor is greater than a preset value, in response to a determination that the terminal is in the stable state;
determine that a display screen of the terminal is provided with a film and determine the first difference value to be a signal intensity calibration value, in response to a determination that the first difference value is greater than the preset value; and
perform screen-off control according to a current signal intensity value measured by the proximity sensor, the signal intensity calibration value and a screen-off threshold value;
wherein the instructions causing the processor to determine whether the terminal is in the stable state according to the average intensity value and the plurality of signal intensity values further cause the processor to:
determine, according to the average intensity value, whether each of a plurality of fluctuation amplitudes of the plurality of signal intensity values is less than a preset fluctuation amplitude; and determine that the terminal is in the stable state, in response to a determination that each of the plurality of fluctuation amplitudes is less than the preset fluctuation amplitude.

13. The terminal of claim 12, wherein the instructions causing the processor to determine, according to the average intensity value, whether each of the plurality of fluctuation amplitudes of the plurality of signal intensity values is less than a preset fluctuation amplitude further cause the processor to:
- obtain a plurality of second difference values between the plurality of signal intensity values and the average intensity value respectively;
- calculate the plurality of fluctuation amplitudes according to the plurality of second difference values and the average intensity value; and
- determine whether each of the fluctuation amplitudes is less than the preset fluctuation amplitude.

14. The terminal of claim 12, wherein the instructions causing the processor to perform the screen-off control according to the current signal intensity value measured by the proximity sensor, the signal intensity calibration value and the screen-off threshold value further cause the processor to:
- obtain the current signal intensity value measured by the proximity sensor;
- calibrate the current signal intensity value according to the signal intensity calibration value to obtain a target signal intensity value; and
- perform the screen-off control according to the target signal intensity value and the screen-off threshold value.

15. The terminal of claim 14, wherein the instructions causing the processor to perform the screen-off control according to the target signal intensity value and the screen-off threshold value further cause the processor to:
- determine whether the target signal intensity value is greater than the screen-off threshold value; and
- turn off a display screen of the terminal in response to a determination that the target signal intensity value is greater than the screen-off threshold value.

16. The terminal of claim 15, wherein the instructions further cause the processor to:
- obtain a screen-on threshold value after the display screen is turned off, wherein the screen-on threshold value is less than the screen-off threshold value;
- obtain the target signal intensity value again, and determine whether the target signal intensity value obtained again is less than the screen-on threshold; and
- light the display screen in response to a determination that the target signal intensity value obtained again is less than the screen-on threshold.

17. The terminal of claim 12, wherein the instructions further cause the processor to:
- determine whether the terminal is currently in a call state; and
- perform an action of performing the screen-off control according to the current signal intensity value measured by the proximity sensor, the signal intensity calibration value, and the screen-off threshold in response to a determination that the terminal is currently in the call state.

* * * * *